United States Patent
Chen et al.

(10) Patent No.: US 9,429,946 B2
(45) Date of Patent: Aug. 30, 2016

(54) DRIVING CONTROL SYSTEM AND DYNAMIC DECISION CONTROL METHOD THEREOF

(71) Applicant: AUTOMOTIVE RESEARCH & TESTING CENTER, Lugang Chen, Changhua Hsien (TW)

(72) Inventors: Shun-Hung Chen, Changhua Hsien (TW); Po-Kai Tseng, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 0 days.

(21) Appl. No.: 14/583,161

(22) Filed: Dec. 25, 2014

(65) Prior Publication Data

US 2016/0187880 A1    Jun. 30, 2016

(51) Int. Cl.

| G05D 1/00 | (2006.01) |
|---|---|
| G06F 19/00 | (2011.01) |
| B60R 21/16 | (2006.01) |
| G05D 1/02 | (2006.01) |
| B60W 40/09 | (2012.01) |
| B60W 50/00 | (2006.01) |
| B60W 40/08 | (2012.01) |

(52) U.S. Cl.
CPC ............ *G05D 1/0088* (2013.01); *B60W 40/09* (2013.01); *B60W 50/0098* (2013.01); *G05D 1/0268* (2013.01); *B60W 2040/0818* (2013.01); *B60W 2050/0005* (2013.01); *B60W 2050/0014* (2013.01); *B60W 2050/0018* (2013.01); *B60W 2050/0071* (2013.01)

(58) Field of Classification Search
USPC .............................. 701/27; 700/245; 280/735
See application file for complete search history.

(56) References Cited

U.S. PATENT DOCUMENTS

| 6,370,475 | B1* | 4/2002 | Breed | B60N 2/2863 340/436 |
|---|---|---|---|---|
| 2005/0246062 | A1* | 11/2005 | Keibel | B25J 9/1607 700/245 |
| 2006/0232052 | A1* | 10/2006 | Breed | B60R 21/013 280/735 |
| 2009/0192710 | A1* | 7/2009 | Eidehall | B62D 15/0265 701/301 |
| 2010/0082195 | A1* | 4/2010 | Lee | B62D 15/025 701/25 |
| 2010/0121503 | A1* | 5/2010 | Sundqvist | G05D 1/0287 701/11 |
| 2010/0191391 | A1* | 7/2010 | Zeng | G01S 13/723 701/1 |

(Continued)

FOREIGN PATENT DOCUMENTS

CN      100559211 C     11/2009

*Primary Examiner* — Thomas G Black
*Assistant Examiner* — Tyler Paige
(74) *Attorney, Agent, or Firm* — patenttm.us

(57) ABSTRACT

A driving control system mounted in a vehicle receives multiple pieces of information through a status detection module and a vehicle safety determination module thereof, performs a safety and collision analysis to predict whether a driving danger exists, when a driving danger exists, instructs an emergency control module to calculate an optimal barrier-avoiding path and send a corresponding control signal to a vehicle control module, and when no driving danger exists, instructs a normal control module to perform an adaptive algorithm according to different road conditions and driver's behavior information and send a control signal to the vehicle control module. Accordingly, the driving control system can instantly plan a barrier-avoiding path according the degree of emergency and collision danger to achieve the goal of enhancing safety and stability of the vehicle and driver in driving.

14 Claims, 5 Drawing Sheets

(56) References Cited

U.S. PATENT DOCUMENTS

2012/0271518 A1* 10/2012 Van Den Broek  B60W 30/0956
 701/48

2013/0179382 A1* 7/2013 Fritsch ................... G06N 7/005
 706/46

* cited by examiner

DRIVING CONTROL SYSTEM AND DYNAMIC DECISION CONTROL METHOD THEREOF

BACKGROUND OF THE INVENTION

1. Field of the Invention

The present invention relates to a driving system and a control system thereof, and more particularly, to a driving control system and a dynamic decision control method thereof.

2. Description of the Related Art

Lately, smart cars have emerged to become a mainstream in the automotive market and usually rely on driving control systems to collect and analyze information about vehicle driving condition and road condition or distance behind a vehicle. An autonomous driving assistance system (ADAS) of the latest smart car technology assists the driver with issuing commands through electronic equipment, such that the vehicle equipped with the system can be instructed to drive forward, make a turn, temporarily stop and then wait for a start if a pedestrian runs into the driving path of the vehicle, drive all the way to a pre-determined parking lot and park in a designated space, and drive back to the driver after receiving an instruction again. The ADAS employs sensing approaches, such as GPS (Global Positioning System), radar, image-capturing device and the like, to plan for driving routes and instruct the vehicle to drive according to the planned routes, and further collect signals on the road and detect surrounding activities through sensors mounted around the body of the vehicle. Hence, despite other badly parked vehicles in the neighborhood, the ADAS will be informed of the situation to correct driving paths for collision avoidance and help the vehicle successfully park into a parking space.

Upon development of vehicle dynamic control (VDC) technique, conventional ADAS focuses on development of the foregoing system performance while ignoring control of safety and stability of vehicle driving under a specific speed. As disclosed in China Patent Publication No. CN100559211C (hereinafter prior art), entitled "Process for enhancing the safety and/or comfort of a motor vehicle", the goal of the prior art is to mainly enhance the safety and/or comfort at driving with latest technique of navigation system. A vehicle control device or a set of related control device mounted in a vehicle for enhancing driving safety generates data that are logically combined with data or plotting data from a navigation system. The plotting data and information associated with a current driving condition directly or indirectly detected through a sensor in the vehicle are used to determine a current danger value. A function unit responsible for safety enhancement is activated depending on the danger value. In particular, visual, audible or vibrating alert is additionally provided or replaces the activation of the function unit to warn the driver.

As can be seen from the conventional techniques, conventional VDC systems primarily count on the sensing approaches using GPS, radar, image-capturing device and the like to achieve the functions, such as automatic parking, automatic pickup of vehicle, and the like, while paying less attention to the control issues of safety and stability at fast driving of vehicle. Although the prior art utilizes navigation information to provide an alert system for enhancing driving safety and/or stability, such alert system only serves to passively inform the driver of the safety concerns, and the driver's behavior has nothing to do with the system in the prior art. Accordingly, the system in the prior art fails to effectively and actively assist the driver in danger.

SUMMARY OF THE INVENTION

An objective of the present invention is to provide a driving control system and a dynamic decision control method thereof targeting at providing active and instant automatic dynamic decision-making in driving of a vehicle through multiple control modules in the driving control system, stabilizing vehicle control under a danger-free situation, and instantly planning a barrier-avoiding path under a dangerous situation for the purpose of higher safety and stability in driving.

To achieve the foregoing objective, the dynamic decision control method of a driving control system mounted in a vehicle is performed by the driving control system and has steps of:

receiving multiple pieces of environment information and multiple pieces of driving status information;

performing a safety analysis according to the multiple pieces of environment information and the multiple pieces of driving status information;

determining whether a result of the safety analysis indicates that a driving danger exists;

performing a normal control process when no driving danger exists;

performing a collision analysis when a driving danger exists;

sending out a response command to slow down the vehicle when a result of the collision analysis indicates that no collision will happen; and performing an emergency control process when the result of the collision analysis indicates that a collision will happen.

In the foregoing steps, the driving control system receives multiple pieces of environment information and multiple pieces of driving status information, and performs a safety analysis to predict whether a driving danger exists according to the multiple pieces of information. Under the circumstance of regular driving, there is no driving danger usually and the driving control system performs the normal control process to adapt to different road conditions and maintain the driving stability. When the safety analysis indicates a driving danger, the driving control system further performs a collision analysis to determine whether a collision with an object in front of the vehicle will happen. When the vehicle keeps a safety distance from the object in the front, the likelihood of collision is relatively low and the driving control system just needs to issue a response command to slow down the vehicle. When the collision analysis indicates that a collision will take place, the driving control system immediately performs a corresponding emergency control process to change a moving path of the vehicle to enhance driving safety and stability.

To achieve the foregoing objective, the driving control system is mounted in a vehicle and has a vehicle safety determination module, a normal control module and an emergency control module.

The vehicle safety determination module receives multiple pieces of environment information and multiple pieces of driving status information and predicts whether an emergency event will take place according to a safety analysis and a collision analysis.

The normal control module is connected to the vehicle safety determination module and generates a vehicle dynamic control signal according to multiple types of pre-defined road condition information and multiple pieces of pre-defined driver's behavior information.

The emergency control module is connected to the vehicle safety determination module, and when the vehicle encounters an emergency event, the emergency control module performs an emergency control process with the multiple pieces of driving status information and generates a path control signal for barrier avoidance.

The driving control system is mounted in a vehicle for operation, receives multiple pieces of environment information and multiple pieces of driving status information through the vehicle safety determination module, performs the safety analysis and the collision analysis to predict whether a driving danger exists, where no driving danger exists, the normal control module performs the normal control process containing the adaptive algorithm according to the pre-defined multiple types of road condition information and the pre-defined multiple types of driver's behavior information in generation of a vehicle dynamic control signal for stabilizing a dynamic moving path of the vehicle. When the vehicle safety determination module determines that a driving danger and an emergency event both will take place, the emergency control module performs the emergency control process with the multiple pieces of driving status information and generates a path control signal for barrier avoidance to control a dynamic moving path for emergency, such that the vehicle equipped with the driving control system can instantly plan a moving path for barrier avoidance depending on the degree of emergency and collision risk to attain the goal of enhancing safety and stability of the vehicle in driving.

Other objectives, advantages and novel features of the invention will become more apparent from the following detailed description when taken in conjunction with the accompanying drawings.

DETAILED DESCRIPTION OF THE INVENTION

Figure 1:
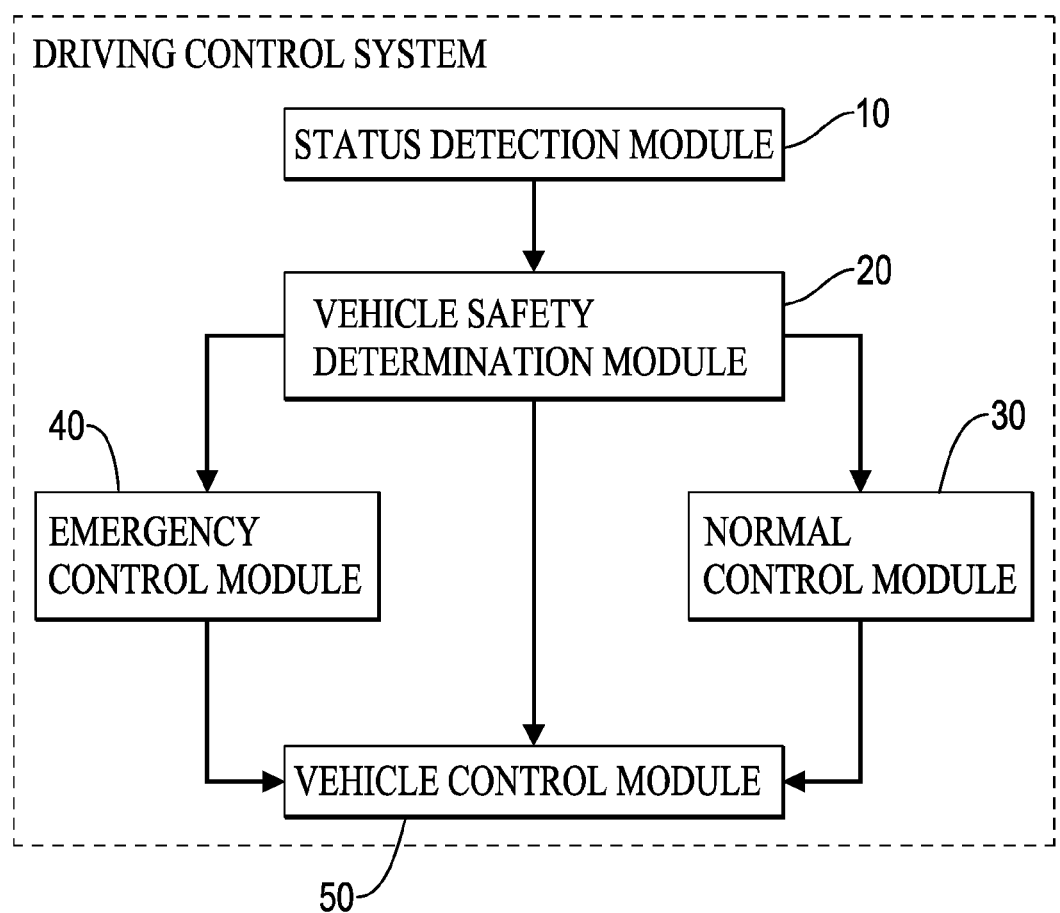
FIG. 1 is a functional block diagram of a first embodiment of a driving control system in accordance with the present invention.

With reference to FIG. 1, a first embodiment of a driving control system in accordance with the present invention is mounted in a vehicle and includes a status detection module 10, a vehicle safety determination module 20, a normal control module 30, an emergency control module 40 and a vehicle control module 50. The vehicle safety determination module 20 is connected to the status detection module 10, the normal control module 30, the emergency control module 40 and the vehicle control module 50. The vehicle control module 50 is connected to the normal control module 30 and the emergency control module 40.

The status detection module 10 detects and captures multiple pieces of road condition information and multiple pieces of environment information of an environment in front of the vehicle, and predicts according to a dynamic vehicle condition of the vehicle to acquire multiple pieces of driving status information, and further acquire multiple pieces of navigation information for signal analysis. The status detection module 10 may include an image-capturing unit (Camera), a radar unit, a lidar (Laser imaging detection and ranging) unit, a positioning unit (GPS), an inertial measurement unit (IMU) and the like.

The vehicle safety determination module 20 receives the multiple pieces of environment information and the multiple pieces of driving status information provided by the status detection module 10, and carries out a safety analysis and a collision analysis to predict whether a dangerous event or a collision event will take place. When the vehicle safety determination module 20 determines that no dangerous event will happen, the normal control module 30 is activated. The normal control module 30 performs a normal control process containing an adaptive algorithm to generate a dynamic vehicle control signal according to multiple types of preset road condition information and multiple types of preset driver's behavior information corresponding to the multiple types of preset road condition information and to send corresponding control signals to the vehicle control module 50 for the vehicle control module 50 to stably control a dynamic moving path of the vehicle. In the present embodiment, the safety analysis is performed with a distance behind an object, a relative speed between the vehicle and the object, acceleration of the vehicle, and one piece of the multiple pieces of environment information. The collision analysis is performed with a braking distance or one piece of the multiple pieces of driving status information.

When determining that a dangerous event instead of a collision event will happen, the vehicle safety determination module 20 sends a response command indicative of a control signal to the vehicle control module 50 to slow down the vehicle. The vehicle control module 50 controls the vehicle to gently apply the brake and decelerate the vehicle. When determining that a collision event will happen, the vehicle safety determination module 20 then activates the emergency control module 40 for the emergency control module 40 to perform an emergency control process according to the multiple pieces of driving status information and generate a barrier avoidance path control signal without causing vehicle rollover, and sends corresponding control signals to the vehicle control module 50 so as to instruct the vehicle control module 50 to control a dynamic emergency path of the vehicle and avoid the object in the front to be collided.

Figure 2:
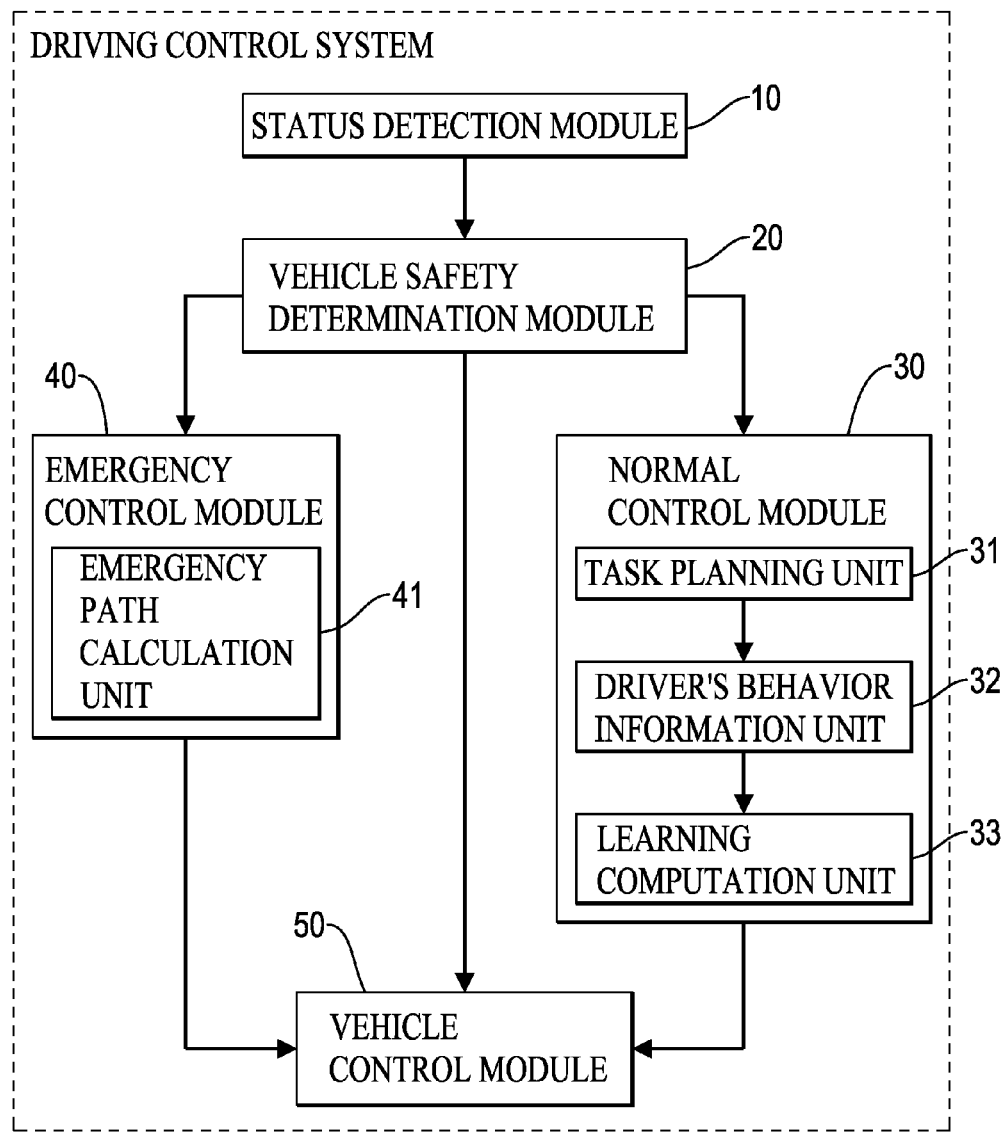
FIG. 2 is a functional block diagram of a second embodiment of a driving control system in accordance with the present invention.

With reference to FIG. 2, a second embodiment of a driving control system in accordance with the present invention is substantially the same as the foregoing embodiment except that the normal control module 30 has a task planning unit 31, a driver behavior information unit 32, and a learning computation unit 33, and the emergency control module 40 has an emergency path calculation unit 41. The driver's behavior information unit 32 is connected to the task planning unit 31 and the learning computation unit 33. The task planning unit 31 is connected to the vehicle safety determination module 20. The learning computation unit 33 is connected to the vehicle control module 50. The emergency path calculation unit 41 is connected to the vehicle safety determination module 20 and the vehicle control module 50.

The task planning unit 31 pre-defines multiple types of road condition information and multiple types of driver's behavior information corresponding to the pre-defined multiple types of road condition information, receives multiple images, multiple vehicle signals and the like captured by the status detection module 10 to determine road conditions that the vehicle drive through, and transmits multiple pieces of information including multiple pieces of driver's behavior information to the driver's behavior information unit 32 for the driver's behavior information unit 32 to store the multiple pieces of driver's behavior information corresponding to the road conditions. Each piece of driver's behavior information includes a driving speed, a steer wheel turning angle, an accelerator pedal position, a brake pedal position, a shift position and the like. The learning computation unit 33 further performs the normal control process containing the adaptive algorithm to generate a vehicle dynamic control signal and sends corresponding control signals to the vehicle control module 50 for the vehicle control module 50 to stabilize and control a dynamic moving path of the vehicle.

In the present embodiment, the learning computation unit 33 receives the multiple pieces of driver's behavior information transmitted from the driver's behavior information unit 32 to establish multiple types of operational control information conducted by professional drivers, such as turning left, keeping straight on, turning right and the like, based on human factors engineering and to perform a normal control process in an optimal manner. The normal control process includes steps of analyzing multiple pieces of road condition information, multiple pieces of driver's behavior information, and the multiple types of operational control information conducted by professional drivers to perform an analysis, such that the multiple pieces of driver's behavior information adaptive to different road conditions can be provided, performing an adaptive algorithm to obtain control parameters associated with one most comfortable piece of driver's behavior information to the driver, feeding back the control parameters obtained after the adaptive algorithm is performed and continuously performing the comparison, the analysis and the execution of the adaptive algorithm to finally generate an optimal normal control signal for controlling a dynamic moving path of the vehicle. Accordingly, the learning computation unit 33 can adapt to different driving environments and driver's behavior to perform the normal control process in an optimal manner.

In the present embodiment, the adaptive algorithm may be a model reference adaptive control (MRAC) algorithm, a neural network algorithm, a clustering algorithm, a self-organization mapping (SOM) algorithm or the like. The control parameters associated with the most comfortable piece of driver's behavior information include a driving speed, a steer wheel turning angle, an accelerator pedal position, a brake pedal position, a shift position and the like.

The emergency path calculation unit 41 receives the multiple pieces of driving status information, which include a speed of the vehicle and a maximum rotation radius associated with the speed of the vehicle, and perform the emergency control process according to relevance of the multiple pieces of driving status information. The emergency control process includes steps of receiving the multiple pieces of driving status information containing the speed of the vehicle, calculating a path with a maximum barrier-avoiding radius according to the speed and a rotatable radius of the vehicle without causing rollover of the vehicle, and generating a path control signal for barrier avoidance that instructs the vehicle control module 50 to control a dynamic emergency path of the vehicle. Specifically, the emergency path calculation unit 41 calculates the speed of the vehicle according to the multiple pieces of information acquired from the status detection module 10, and further generates an optimal path with the maximum barrier-avoiding radius according to a preset relationship between the speed of the vehicle and the maximum rotation radius without causing rollover of the vehicle, so as to generate the path control signal for barrier avoidance for the vehicle control module 50 to receive and to control a dynamic emergency path of the vehicle that precisely and timely avoids an object in front of the vehicle to be collided.

Figure 3:
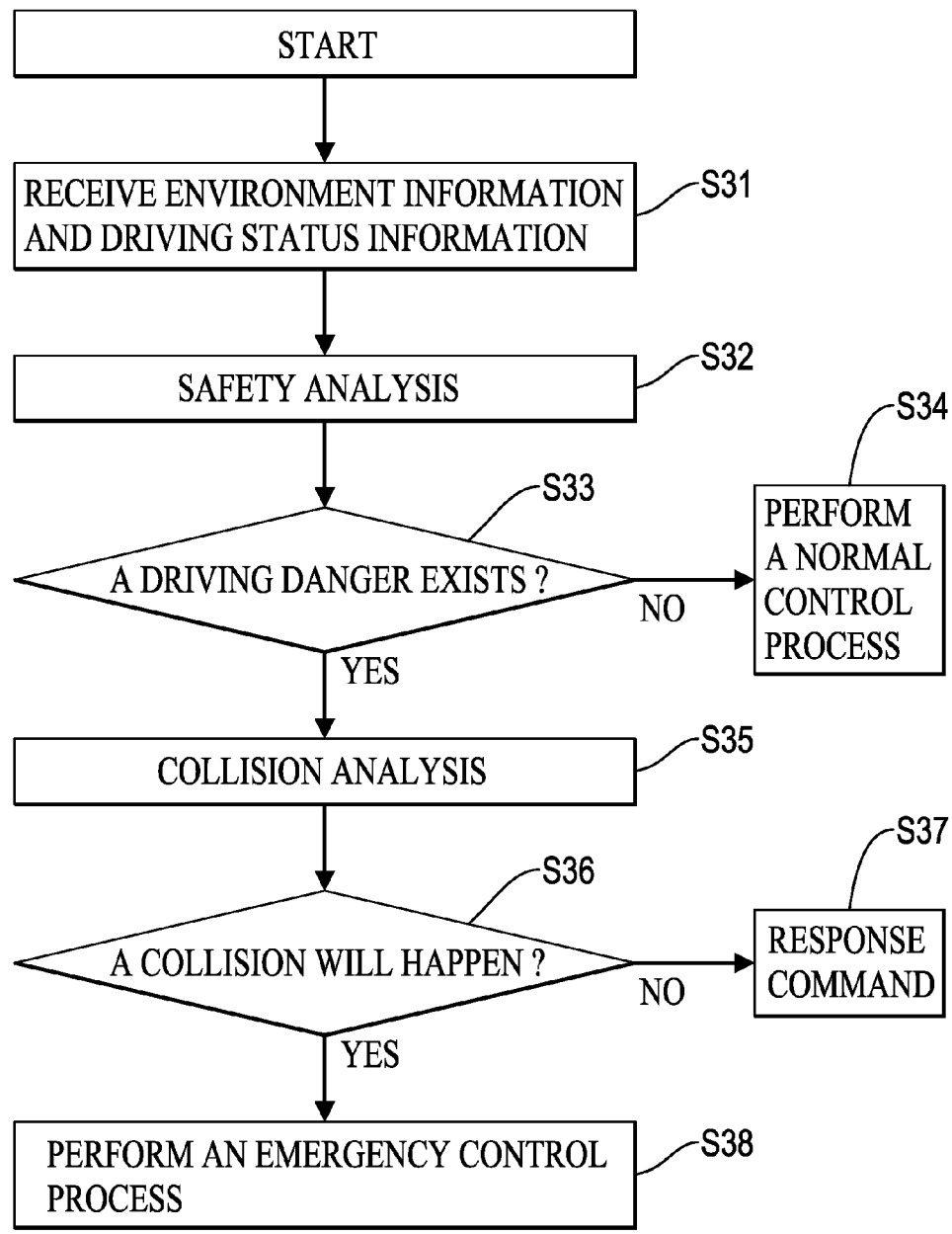
FIG. 3 is a flow diagram of a dynamic decision control method in accordance with the present invention.

With reference to FIG. 3, a dynamic decision control method in accordance with the present invention can be further concluded from the foregoing driving control system mounted in a vehicle. The dynamic decision control method has the following steps.

Step S31: The vehicle safety determination module 20 of the driving control system receives multiple pieces of environment information and multiple pieces of driving status information.

Step S32: The vehicle safety determination module 20 carries out a safety analysis according to the multiple pieces of environment information and the multiple pieces of driving status information.

Step S33: The vehicle safety determination module 20 determines whether a result of the safety analysis indicates that a driving danger exists. When no driving danger exists, step S34 is performed. Otherwise, step S35 is performed.

Step S34: The normal control module 30 of the driving control system performs a normal control process.

Step S35: The vehicle safety determination module 20 carries out a collision analysis.

Step S36: The vehicle safety determination module 20 determines whether a result of the collision analysis indicates that a collision will happen. When no collision will happen, step S37 is performed. Otherwise, step S38 is performed.

Step S37: The vehicle safety determination module 20 sends a response command to the vehicle control module 50 to slow down the vehicle.

Step S38: The emergency control module of the driving control system performs an emergency control process.

Figure 4:
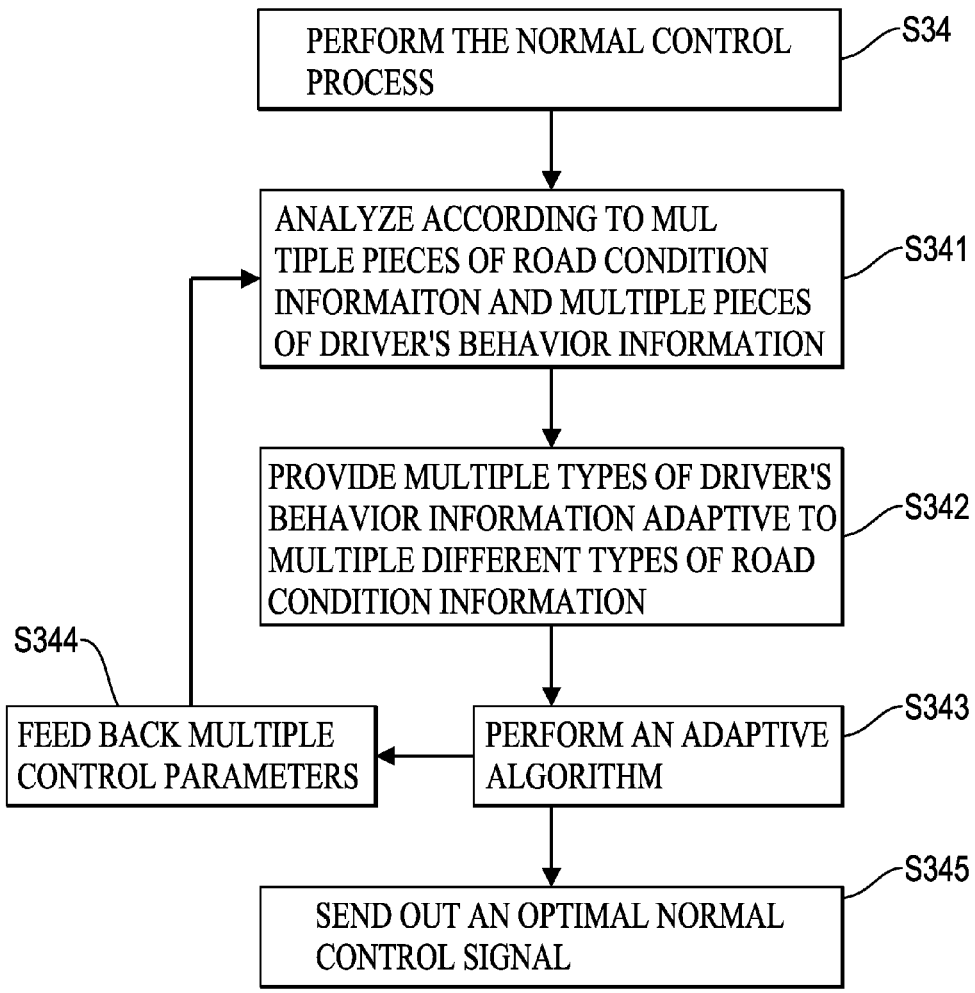
FIG. 4 is a flow diagram of a normal control process in the dynamic decision control method in FIG. 3.

During a normal driving condition, there is usually no driving danger. Therefore, the normal control process is performed to adapt to different road conditions and achieve the effect of stable driving. With reference to FIG. 4, step S34 further has the following steps.

Step S341: The task planning unit 31 of the normal control module 30 provides multiple pieces of road condition information and multiple pieces of driver's behavior information corresponding to the multiple pieces of road condition information for the driver's behavior information unit 32 to perform an analysis.

Step S342: The driver's behavior information unit 32 provides multiple types of driver's behavior information adaptive to the multiple different types of road condition information.

Step S343: The learning computation unit 33 performs an adaptive algorithm and then performs step S344 and step S345.

Step S344: The learning computation unit 33 feeds back multiple control parameters to step S341.

Step S345: The learning computation unit 33 sends an optimal normal control signal to the vehicle control module 50 for the vehicle control module 50 to stably control a dynamic moving path of the vehicle.

Figure 5:
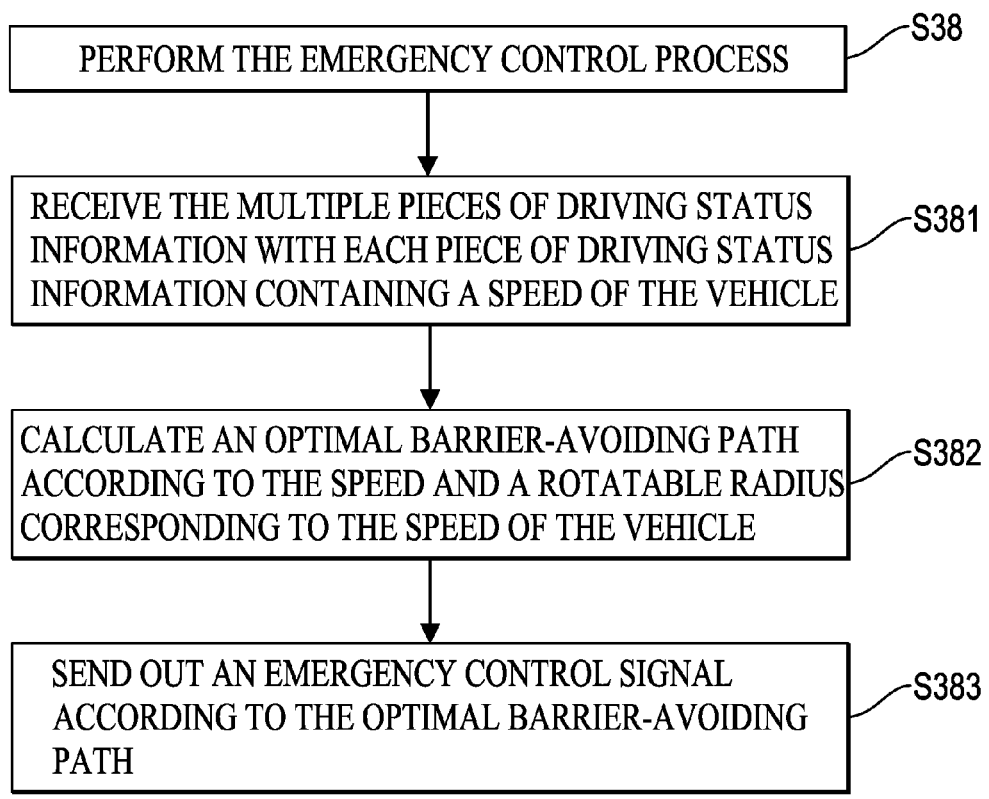
FIG. 5 is a flow diagram of an emergency control process in the dynamic decision control method in FIG. 3.

When the result of the safety analysis indicates that a driving danger exists, the collision analysis is then performed to determine if an object in front of the vehicle will be collided by the vehicle. When the collision analysis indicates that a collision will happen, the emergency control process is immediately performed to change a moving path of the vehicle. With reference to FIG. 5, step S38 further has the following steps.

Step S381: The emergency path calculation unit 41 of the emergency control module 40 receives the multiple pieces of driving status information with each piece of driving status information containing a speed of the vehicle.

Step S382: The emergency path calculation unit 41 calculates an optimal barrier-avoiding path according to the speed in each piece of driving status information and a rotatable radius of the vehicle corresponding to the speed.

Step S383: The emergency path calculation unit 41 sends out an emergency control signal for barrier avoidance according to the optimal barrier-avoiding path to instruct the vehicle control module 50 to control a dynamic moving path for emergency of the vehicle.

When the driver maintains a safe distance from an object in front of the vehicle during the course of driving, likelihood of collision is low. When the result of the collision analysis indicates that no collision will happen, the response command just needs to be sent out to slow down the vehicle. Accordingly, given the driving control system and the dynamic decision control method thereof, safety and stability of vehicle driving at a specific speed can be truly enhanced.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A dynamic decision control method of a driving control system mounted in a vehicle, the dynamic decision control method performed by the driving control system and comprising steps of:

receiving multiple pieces of environment information and multiple pieces of driving status information of a vehicle;

performing a safety analysis according to the multiple pieces of environment information and the multiple pieces of driving status information;

determining whether a result of the safety analysis indicates that a driving danger exists;

performing a normal control process when no driving danger exists, wherein the normal control process has steps of:

providing multiple pieces of driver's behavior information adaptive to multiple pieces of road condition information;

performing an adaptive algorithm according to the multiple pieces of driver's behavior information and the multiple pieces of road condition information and feeding back multiple control parameters to the step of analyzing according to the multiple pieces of road condition information and the multiple pieces of driver's behavior information; and sending out an optimal normal control signal to control a dynamic moving path of the vehicle;

performing a collision analysis when a driving danger exists;

sending out a response command to slow down the vehicle when a result of the collision analysis indicates that no collision will happen; and performing an emergency control process when the result of the collision analysis indicates that a collision will happen, wherein the emergency control process has steps of:

receiving the multiple pieces of driving status information with each piece of driving status information containing a speed of the vehicle;

calculating an optimal barrier-avoiding path according to the speed of the vehicle in each piece of driving status information and a rotatable radius of the vehicle corresponding to the speed of the vehicle without causing rollover of the vehicle; and sending out an emergency control signal according to the optimal barrier-avoiding path.

2. The method as claimed in claim 1, wherein the adaptive algorithm is one of a model reference adaptive control (MRAC) algorithm, a neural network algorithm, a clustering algorithm and a self-organization mapping (SOM) algorithm; and each piece of driver's behavior information includes a driving speed, a steer wheel turning angle, an accelerator pedal position, a brake pedal position and a shift position.

3. A driving control system, mounted in a vehicle and comprising:

a vehicle safety determination module receiving multiple pieces of environment information and multiple pieces of driving status information and predicting whether an emergency event will take place according to a safety analysis and a collision analysis;

a normal control module connected to the vehicle safety determination module and performing an adaptive algorithm to generate a dynamic vehicle control signal according to multiple types of pre-defined road condition information and multiple types of pre-defined driver's behavior information to control a dynamic moving path of the vehicle when no emergency event will take place; and an emergency control module connected to the vehicle safety determination module and having an emergency path calculation unit to receive the multiple pieces of driving status information with each piece of driving status information containing a speed of the vehicle, calculate an optimal barrier-avoiding path according to the speed of the vehicle in each piece of driving status information and a rotatable radius of the vehicle corresponding to the speed of the vehicle without causing rollover of the vehicle, and generate a path control signal for barrier avoidance when the vehicle encounters an emergency event.

4. The system as claimed in claim 3, wherein the normal control module has:

a task planning unit pre-defining and sending out the multiple types of road condition information and multiple types of driver's behavior information corresponding to the multiple types of road condition information;

a driver behavior information unit receiving and storing the multiple types of driver's behavior information corresponding to the multiple types of road condition information; and a learning computation unit performing an adaptive algorithm to generate the dynamic vehicle control signal according to the multiple types of road condition information and the multiple types of driver's behavior information.

5. The system as claimed in claim 4, wherein the learning computation unit receives the stored multiple types of driver's behavior information transmitted from the driver's behavior information unit to establish multiple types of operational control information based on human factors engineering and perform the normal control process.

6. The system as claimed in claim 5, wherein the safety analysis is performed with a distance behind an object, a relative speed between the vehicle and the object, acceleration of the vehicle, and one piece of the multiple pieces of environment information, and the collision analysis is performed with a braking distance.

7. The system as claimed in claim 6, further comprising:
a status detection module connected to the vehicle safety determination module, capturing multiple pieces of road condition information and multiple pieces of environment information of an environment in front of the vehicle, predicting according to a dynamic vehicle condition of the vehicle to acquire multiple pieces of driving status information, and acquiring multiple pieces of navigation information for signal analysis; and
a vehicle control module connected to the vehicle safety determination module, the normal control module and the emergency control module, and receiving control signals transmitted from the vehicle safety determination module, the normal control module and the emergency control module to control the vehicle with a corresponding control action.

8. The system as claimed in claim 7, wherein
the status detection module has an image-capturing unit, a radar unit, a lidar (Laser imaging detection and ranging) unit, a positioning unit and an inertial measurement unit;
the adaptive algorithm is a model reference adaptive control (MRAC) algorithm, a neural network algorithm, a clustering algorithm, or a self-organization mapping (SOM) algorithm; and
each piece of driver's behavior information includes a driving speed, a steer wheel turning angle, an accelerator pedal position, a brake pedal position and a shift position.

9. The system as claimed in claim 5, further comprising:
a status detection module connected to the vehicle safety determination module, capturing multiple pieces of road condition information and multiple pieces of environment information of an environment in front of the vehicle, predicting according to a dynamic vehicle condition of the vehicle to acquire multiple pieces of driving status information, and acquiring multiple pieces of navigation information for signal analysis; and
a vehicle control module connected to the vehicle safety determination module, the normal control module and the emergency control module, and receiving control signals transmitted from the vehicle safety determination module, the normal control module and the emergency control module to control the vehicle with a corresponding control action.

10. The system as claimed in claim 9, wherein
the status detection module has an image-capturing unit, a radar unit, a lidar (Laser imaging detection and ranging) unit, a positioning unit and an inertial measurement unit;
the adaptive algorithm is a model reference adaptive control (MRAC) algorithm, a neural network algorithm, a clustering algorithm, or a self-organization mapping (SOM) algorithm; and
each piece of driver's behavior information includes a driving speed, a steer wheel turning angle, an accelerator pedal position, a brake pedal position and a shift position.

11. The system as claimed in claim 4, further comprising:
a status detection module connected to the vehicle safety determination module, capturing multiple pieces of road condition information and multiple pieces of environment information of an environment in front of the vehicle, predicting according to a dynamic vehicle condition of the vehicle to acquire multiple pieces of driving status information, and acquiring multiple pieces of navigation information for signal analysis; and
a vehicle control module connected to the vehicle safety determination module, the normal control module and the emergency control module, and receiving control signals transmitted from the vehicle safety determination module, the normal control module and the emergency control module to control the vehicle with a corresponding control action.

12. The system as claimed in claim 11, wherein
the status detection module has an image-capturing unit, a radar unit, a lidar (Laser imaging detection and ranging) unit, a positioning unit and an inertial measurement unit;
the adaptive algorithm is a model reference adaptive control (MRAC) algorithm, a neural network algorithm, a clustering algorithm, or a self-organization mapping (SOM) algorithm; and
each piece of driver's behavior information includes a driving speed, a steer wheel turning angle, an accelerator pedal position, a brake pedal position and a shift position.

13. The system as claimed in claim 3, further comprising:
a status detection module connected to the vehicle safety determination module, capturing multiple pieces of road condition information and multiple pieces of environment information of an environment in front of the vehicle, predicting according to a dynamic vehicle condition of the vehicle to acquire multiple pieces of driving status information, and acquiring multiple pieces of navigation information for signal analysis; and
a vehicle control module connected to the vehicle safety determination module, the normal control module and the emergency control module, and receiving control signals transmitted from the vehicle safety determination module, the normal control module and the emergency control module to control the vehicle with a corresponding control action.

14. The system as claimed in claim 13, wherein
the status detection module has an image-capturing unit, a radar unit, a lidar (Laser imaging detection and ranging) unit, a positioning unit and an inertial measurement unit;
the adaptive algorithm is a model reference adaptive control (MRAC) algorithm, a neural network algorithm, a clustering algorithm, or a self-organization mapping (SOM) algorithm; and
each piece of driver's behavior information includes a driving speed, a steer wheel turning angle, an accelerator pedal position, a brake pedal position and a shift position.

* * * * *